Sept. 24, 1929. F. A. BUCKNAM 1,729,061
DEPTH REGULATOR AND TRANSPORT FOR DISK HARROWS
Filed July 23, 1923 2 Sheets-Sheet 1
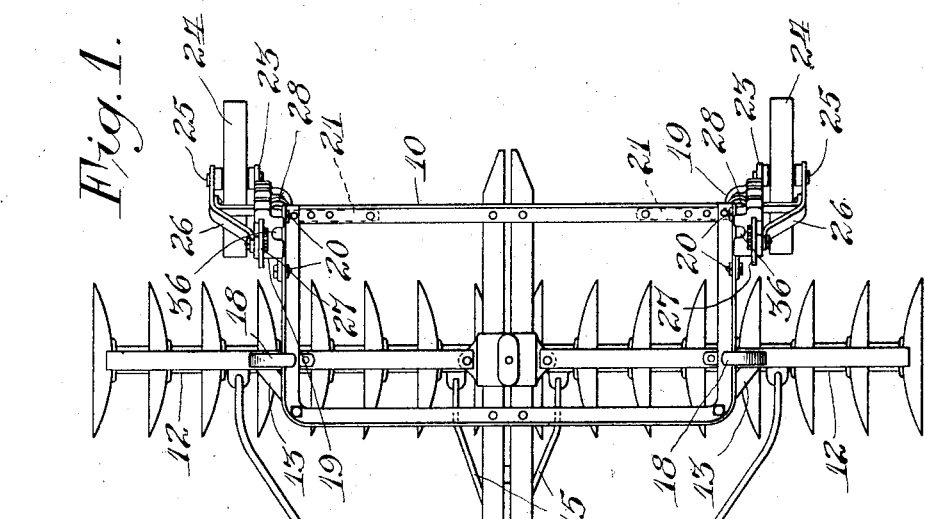
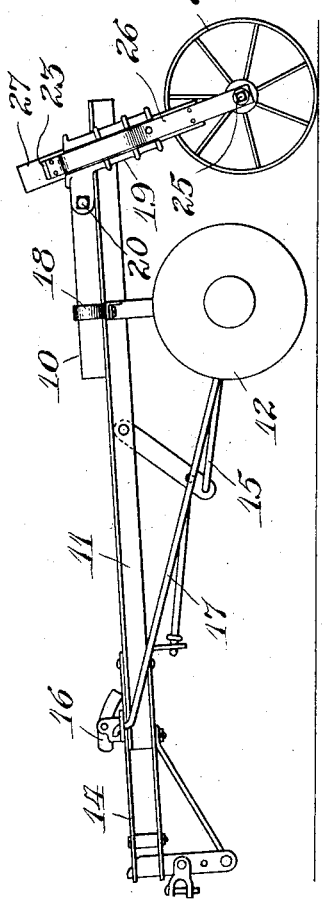
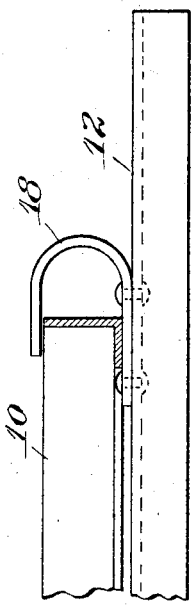
Inventor.
Frederick A. Bucknam,
By
Atty.

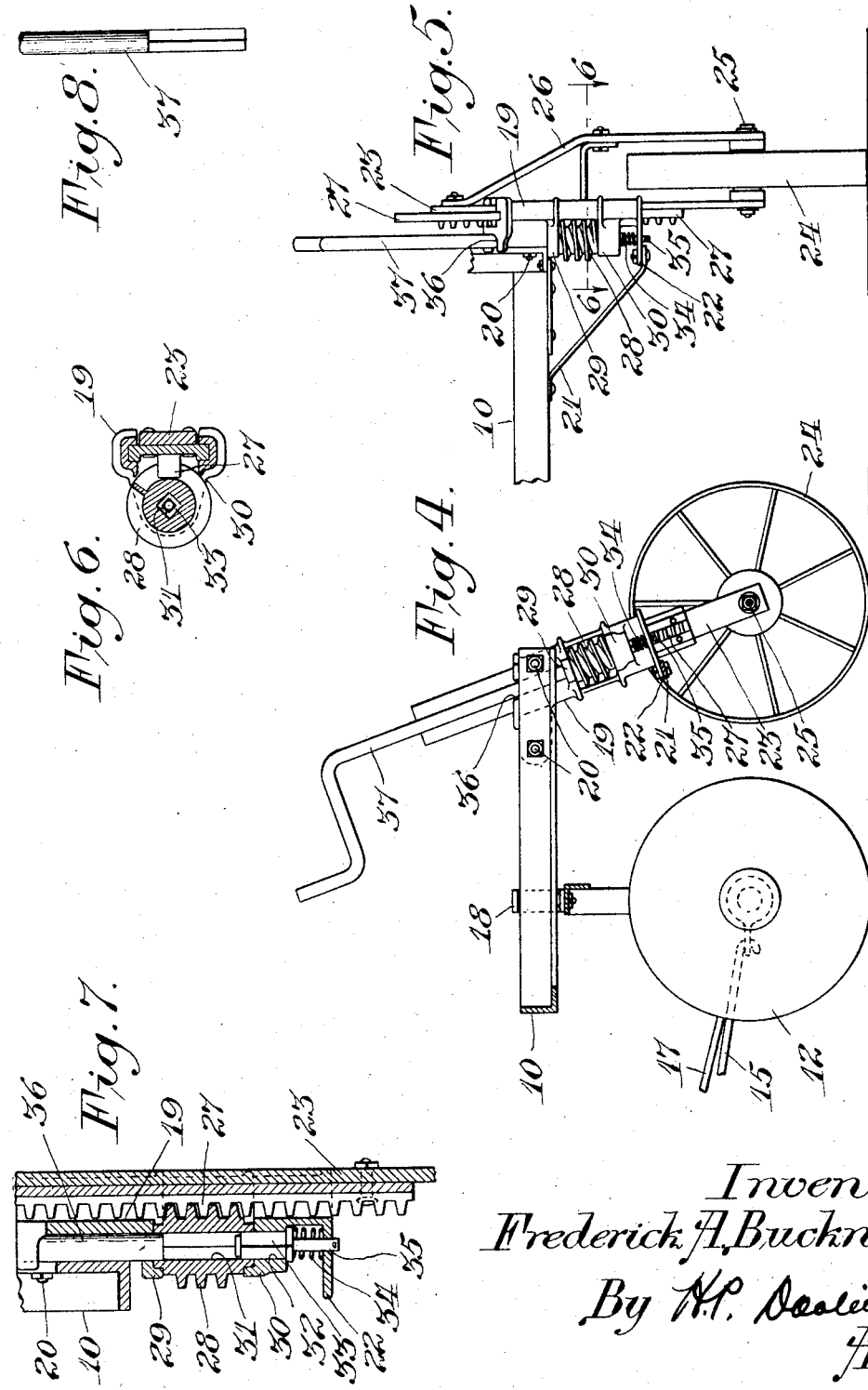

Patented Sept. 24, 1929

1,729,061

UNITED STATES PATENT OFFICE

FREDERICK A. BUCKNAM, OF AUBURN, NEW YORK, ASSIGNOR TO INTERNATIONAL HARVESTER COMPANY, OF CHICAGO, ILLINOIS, A CORPORATION OF NEW JERSEY

DEPTH REGULATOR AND TRANSPORT FOR DISK HARROWS

Application filed July 23, 1923. Serial No. 653,060.

This invention relates to transport means for tillage implements and the particular object in view is to provide a device adapted for use with disk harrows of the heavy, or tractor drawn, type that will serve to control the depth to which the disks may enter the ground and also to elevate them above the ground for transport when desired. To accomplish this, I have combined with the harrow a gage wheel device of simple structure having means permitting the gage wheel to be accurately set at any desired adjustment vertically and there automatically locked, as hereinafter more particularly described and claimed.

In the accompanying drawings—

Fig. 1 is a plan view of a disk harrow including the invention;

Fig. 2 is a side view;

Fig. 3 is a detail view showing a yoke piece for supporting the gang frames on the harrow frame when the gangs are raised;

Fig. 4 is an enlarged side view of the gage device as seen from the inner side;

Fig. 5 is a similar view from the rear;

Fig. 6 is a sectional view on the line 6—6 of Fig. 5;

Fig. 7 is a sectional detail view on a vertical line through the adjusting device; and Fig. 8 is a detail view of the engaging end of the operating crank.

The harrow with which my invention is shown as combined is essentially the same as described in the patent to Dwyer No. 1,336,687, April 13, 1920, and comprises a rectangular frame 10 having secured thereto the forwardly extending draft bars 11 and the usual pair of disk gangs 12. The gangs are pivoted on the frame through the medium of the short links 13 to allow for a certain amount of lateral movement during swinging of the gangs to and from working position. In the present instance, the angling mechanism is shown as comprising a sliding draft head 14 which is equipped with the usual clevis for connection to a tractor and which is connected to the inner ends of the gangs by the links 15. Movement of the draft head 14 back and forth on the draft members 11 by the draft power will therefore straighten and angle the disk gangs and they are locked in desired position by a spring pressed latch member 16 which engages a series of notches in the upper face of the draft head. Brace rods 17 connect the forward ends of the draft members 11 with each disk gang. In order to support the gangs on the frame when the implement is raised for transport, I have provided yoke brackets 18 which are secured to the upper bar of the disk gang frames and extend around and over the side bars of the main frame 10 as clearly shown in Fig. 3.

The main frame 10 of the harrow is made to extend behind the disk gangs and at each rear corner of the frame, there is secured a housing 19. This housing is fixed to the side bars of the frame 10 as by bolts 20 and its lower portion is braced beneath the rear bar of the frame by the member 21 which is secured at its lower end to a horizontally extending flange 22 on the lower end of the housing. The housing 19 is formed with a substantially vertical guideway in which there is slidably mounted the standard 23 carrying the guide wheel 24 that is journaled on a shaft 25, the outer end of which is supported in an outer bracket 26 connected to standard 23. The standard 23 has fixed thereto a rack bar 27 and this rack bar is in mesh with a worm 28 that is journaled in the housing between upper and lower bearing plates 29, 30. The worm 28 is provided with a polygonal opening 31 extending axially therethrough in alinement with a similar opening 32 in the lower bearing plate 30. In the opening 32 there is mounted a plunger 33 which is normally pressed upwardly by a coil spring 34 mounted on a pin 35 projecting from the plunger and engaging a perforation in the flange 22 of the housing. The length of the plunger 33 is such that it normally extends into the lower part of the opening 31 in the worm 28, thereby effectively locking it against turning. The upper part of the housing 19 and the bearing plate 29 are provided with a passage 36 to permit insertion of an operating crank 37 that has its lower end shaped to fit in the polygonal opening 31 in the worm 28, as seen in Fig. 8, and to occupy the entire length of this opening, thereby displacing the plunger 33 and releasing the worm so that it may be turned and the adjusting device actuated.

The operation of the device will be clear from the above description and it will be evident that actuation of the worm 28 by crank 37 makes it possible to move standard 23 which carries the rack bar 27 up and down in its guideway to exactly the extent desired and that withdrawal of the crank will permit plunger 33 to find and engage in the opening 31, thereby preventing any turning of the worm and loss of adjustment such as would occur with coarse worm and rack devices of this type as a result of the jars incident to movement over rough ground. It will also be seen that the harrow can be readily lifted off of the ground for transport and that the yoke brackets 18 will prevent dropping of the outer ends of the disk gangs when this is done.

The above exemplifies the preferred form of my invention but modifications in the details of construction may be made within the scope of the following claims.

What I claim is:

1. A gage device comprising a housing formed with a substantially vertical guideway, a gage wheel having a standard received in the guideway, rack teeth on the standard, a worm on the housing meshing with the rack teeth and formed with a crank receiving opening extending therethrough and a plunger normally engaging the worm in one end of said opening to lock said worm against accidental movement.

2. A gage device comprising a housing formed with a substantially vertical guideway, a gage wheel having a standard received in the guideway, a rack bar secured to the standard, a worm journaled in substantially upright position in the housing in mesh with rack bar and provided with a crank receiving opening extending axially therethrough, and a spring pressed plunger on the housing normally engaged in the lower end of said opening and adapted to be displaced by insertion of an operating crank therein.

3. A gage device for implements comprising a housing formed with a rectilinear guideway therein, a standard slidable in said guideway, gear teeth formed on said standard, a gage wheel journaled on said standard, a worm journaled on said housing and having teeth meshing with the gear teeth on said standard, locking means engaging said worm, and a worm operating member movable relative to said worm to release said locking means.

4. A driven member comprising a rack bar, a driving member comprising a worm having its teeth meshing with the teeth of the rack bar and provided with an axially extending opening for receiving a worm operating device, and a plunger corresponding in cross-section to the opening in the worm and spring pressed toward the worm so as to be adapted to be displaced by the insertion of the operating device in the worm.

5. A driven member, a driving member having operative connection with the driven member, means for rotatably supporting the driving member, a relatively fixed support, a locking plunger slidably and non-rotatively mounted with respect to the support, means for constantly urging the plunger toward the driving member and for projecting the plunger into such relation with the driving member that the driving member is non-rotatively locked to the support and an operating member slidable with respect to the driving member so as to move the plunger to its non-locking position.

6. A driven member having gear teeth formed thereon, a driving member having teeth in rotative engagement with the teeth of the driven member, the driving member being formed with an axial bore of polygonal cross-section, a support rotatively mounting the driving member, a plunger aligned with the bore in the driving member and having a cross-section substantially corresponding to the cross-section of the bore of the driving member, a portion of the support formed with a polygonal bore for non-rotatively and slidably receiving the plunger, means abutting against a portion of the support for constantly urging the plunger to a position wherein it is projected within the bore of the driving member so that the driving member is then rotatively locked to the support, and a removable operating rod insertable within the bore of the driving member and having a portion of such polygonal cross-section that the rod non-rotatively engages the driving member, the plunger being moved by the insertion of the operating rod to its retracted position wherein the driving member is free to turn relative to the support.

In testimony whereof I affix my signature.

FREDERICK A. BUCKNAM.